US006555609B1

(12) United States Patent
Wideman et al.

(10) Patent No.: US 6,555,609 B1
(45) Date of Patent: Apr. 29, 2003

(54) SILICA REINFORCED RUBBER COMPOSITION WHICH CONTAINS THIOGLYCEROL COUPLING AGENT AND BENZOTHIAZYL DISULFIDE AND ARTICLE OF MANUFACTURE, INCLUDING A TIRE, HAVING AT LEAST ONE COMPONENT COMPRISED OF SUCH RUBBER COMPOSITION

(75) Inventors: Lawson Gibson Wideman, Hudson, OH (US); Kevin James Pyle, Uniontown, OH (US); Richard Robinson Smith, Cuyahoga Falls, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 180 days.

(21) Appl. No.: 09/662,280

(22) Filed: Sep. 14, 2000

(51) Int. Cl.[7] .............................. C08K 3/30; C08K 3/36

(52) U.S. Cl. ....................... 524/424; 524/496; 524/571; 523/210; 523/215; 523/216; 152/209.1

(58) Field of Search .......................... 525/349; 524/494, 524/495, 83, 496, 571, 424, 261; 152/209.1; 523/210, 215, 216

(56) References Cited

U.S. PATENT DOCUMENTS

| | | | | | |
|---|---|---|---|---|---|
| 5,094,829 | A | | 3/1992 | Krivak et al. | 423/339 |
| 5,679,728 | A | * | 10/1997 | Kawazura et al. | 523/215 |
| 5,708,069 | A | | 1/1998 | Burns et al. | 524/403 |
| 5,750,610 | A | | 5/1998 | Burns et al. | 524/434 |
| 5,789,514 | A | | 8/1998 | Burns et al. | 528/12 |
| 5,900,467 | A | * | 5/1999 | Wideman et al. | 525/349 |
| 6,028,137 | A | * | 2/2000 | Mahmud et al. | 524/496 |

FOREIGN PATENT DOCUMENTS

| | | | |
|---|---|---|---|
| EP | 0897949 | 2/1999 | C08K/5/47 |
| EP | 0933391 | 8/1999 | C08K/3/26 |
| EP | 0941872 | 9/1999 | B60C/1/00 |

* cited by examiner

*Primary Examiner*—David W. Wu
*Assistant Examiner*—R. Harlan
(74) *Attorney, Agent, or Firm*—Henry C. Young, Jr.

(57) ABSTRACT

This invention relates to a conjugated diene-based rubber composition reinforced with silica-based reinforcement together with a non-silane coupling agent as a combination of 1-thioglycerol(3-mercapto-1,2-propanediol) and 2,2'-benzothiazyl disulfide. Said coupling agent materials may be provided for mixing with said diene-based rubber(s), for example, as individual materials, as at least one of said materials being supported on a carbon black carrier or as being pre-reacted, or otherwise pre-treated, with synthetic silica aggregates. The invention includes an article of manufacture, including a tire, having at least one component comprised of such rubber composition.

20 Claims, No Drawings

SILICA REINFORCED RUBBER COMPOSITION WHICH CONTAINS THIOGLYCEROL COUPLING AGENT AND BENZOTHIAZYL DISULFIDE AND ARTICLE OF MANUFACTURE, INCLUDING A TIRE, HAVING AT LEAST ONE COMPONENT COMPRISED OF SUCH RUBBER COMPOSITION

FIELD OF THE INVENTION

This invention relates to a conjugated diene-based rubber composition reinforced with silica-based reinforcement together with a non-silane coupling agent as a combination of 1-thioglycerol(3-mercapto-1,2-propanediol) and 2,2'-benzothiazyl disulfide. Said coupling agent materials may be provided for mixing with said diene-based rubber(s), for example, as individual materials, as at least one of said materials being supported on a carbon black carrier or as being pre-reacted, or otherwise pre-treated, with synthetic silica aggregates. The invention includes an article of manufacture, including a tire, having at least one component comprised of such rubber composition.

BACKGROUND FOR THE INVENTION

For various applications utilizing rubber compositions, carbon black and/or synthetic amorphous silica-based materials are conventionally used as particulate reinforcing fillers for the elastomer(s) of the rubber composition(s).

Often a coupling agent is used together with the silica in order to couple, or otherwise enhance, its elastomer reinforcement effect for the elastomer(s) and such use of a coupling agent is well known to those having skill in such art.

Historically, such coupling agents may be, for example, silane-based compounds which have one moiety (a silane-based moiety such as, for example, an alkoxysilane moiety) which is reactive with hydroxyl groups (e.g. silanol groups) on the surface of a synthetic amorphous silica and having another moiety (e.g. a polysulfide bridge) which becomes interactive with a conjugated diene-based elastomer.

For example, bis-(3-trialkoxysilylpropyl) polysulfides having an average of from 2 to 4 connecting sulfur atoms in their polysulfidic bridge are often used as a coupling agent (or adhesive) to enhance coupling of synthetic amorphous silicas, such as aggregates of precipitated silica, to various conjugated diene-based elastomers. Use of such coupling agents is well known to those having skill in such art.

However, use of silane-containing coupling agents, or adhesives, which rely upon a reaction between the silane and hydroxyl groups (e.g. silanol groups) on the surface of a synthetic amorphous silica typically releases an alcohol as a by product of such reaction. For example, a reaction of a bis-(3-triethoxysilylpropyl) tetrasulfide coupling agent with silanol groups on the surface of a silica material releases ethanol as a byproduct.

For various purposes, it may be desired toreduce or substantially eliminate, or even entirely eliminate such alcohol evolution created by an in situ reaction of said reactants, with an associated alcohol formation, within an elastomer host during the mixing of a rubber composition which contains such reactants.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, a rubber composition is provided which comprises (A) 100 parts by weight of at least one diene hydrocarbon based elastomer, (B) about 25 to about 100, optionally about 35 to about 90, phr of particulate reinforcing filler comprised of about zero to about 100, alternately about 10 to about 70, phr of synthetic amorphous silica aggregates and, correspondingly, from zero to about 75, alternately about 10 to about 60, phr of at least one of carbon black and silica treated carbon black having domains of silica on its surface, wherein said silica aggregates and said silica domains on the surface of said treated carbon black contain hydroxyl groups (e.g. silanol groups) on their surface; and (C) about 0.5 to about 10, preferably about 1 to about 7, phr of a coupling agent as a combination of materials consisting of 1-thioglycerol(3-mercapto-1,2-propanediol) and 2,2'-benzothiazyl disulfide in a weight ratio of said thioglycerol material to said disulfide material in a range of from about 1 to 10 and 10 to 1;

wherein said coupling agent materials are mixed with said elastomer(s), according to one or more of the following:

(1) mixing said 1-thioglycerol(3-mercapto-1,2-propanediol) and said 2,2"-benzothiazyl disulfide with said elastomer(s) and said particulate reinforcement in an internal rubber mixer;

(2) mixing said 1-thioglycerol(3-mercapto-1,2-propanediol) and said 2,2"-benzothiazyl disulfide with said elastomer(s) and said particulate reinforcement in an internal rubber mixer, wherein at least one of said 1-thioglycerol(3-mercapto-1,2-propanediol) and said 2,2"-benzothiazyl disulfide has been pre-reacted with said carbon black to form a carbon black composite thereof;

(3) mixing said 1-thioglycerol(3-mercapto-1,2-propanediol) and said 2,2"-benzothiazyl disulfide with said elastomer(s) and said particulate reinforcement in an internal rubber mixer, wherein at least one of said 1-thioglycerol(3-mercapto-1,2-propanediol) and said 2,2"-benzothiazyl disulfide has been pre-reacted with said silica treated carbon black to form a silica treated carbon black composite thereof, (4) mixing said 1-thioglycerol(3-mercapto-1,2-propanediol) and said 2,2"-benzothiazyl disulfide with said elastomer(s) and said particulate reinforcement in an internal rubber mixer, wherein at least one of said 1-thioglycerol(3-mercapto-1,2-propanediol) and said 2,2"-benzothiazyl disulfide has been pre-reacted with (a) a synthetic precipitated silica or (b) an aqueous dispersion of colloidal silica particles from which a precipitated silica is recovered to form a silica composite thereof, 5. mixing said 1-thioglycerol(3-mercapto-1,2-propanediol) and said 2,2"-benzothiazyl disulfide with said elastomer(s) and said particulate reinforcement in an internal rubber mixer, according to any of said steps (1), (2), (3) or (4) wherein said particulate reinforcement includes at least one of said synthetic precipitated silica aggregates and said silica treated carbon black which has been pre-hydrophobated prior to mixing with said elastomers with an alkylsilane of the general formula (I):

$$X_n—Si—R_{4-n} \quad (I)$$

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3, 6. mixing said 1-thioglycerol(3-mercapto-1,2-propanediol) and said 2,2"-benzothiazyl disulfide with said elastomer(s) and an alkylsilane of the said formula (I) with said elastomer(s) and particulate reinforcement in an internal rubber mixer, and 7. mixing said 1-thioglycerol(3-mercapto-1,2-propanediol) and said 2,2"-benzothiazyl disulfide and said alkylsilane of formula (I) with said elastomer(s) and said particulate reinforcement in an internal rubber mixer, wherein said 1-thioglycerol(3-mercapto-1,2-propanediol), said 2,2"-benzothiazyl disulfide and said alkylsilane of formula (I) have all been pre-reacted with
   (a) a synthetic precipitated silica or
   (b) an aqueous dispersion of colloidal silica particles from which a precipitated silica is recovered to form a silica composite thereof.

In further accordance with this invention, an article of manufacture is provided which contains at least one component comprised of the rubber composition of this invention.

In additional accordance with this invention, a tire is provided which contains at least one component comprised of the rubber composition of this invention.

In further accordance with this invention, a tire is provided having a tread comprised of the rubber composition of this invention.

Accordingly, the synthetic amorphous silica may be selected from aggregates of precipitated silica, which is intended to include precipitated aluminosilicates as a co-precipitated silica and aluminum, and from fumed (pyrogenically formed) silica, whereas the silica is preferably a precipitated silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The carbon black with domains of exposed silica on its surface may be, for example, carbon black prepared by treatment of carbon black by reaction of an alkyl silane (e.g. an alkoxy silane) with carbon black or by co-fuming carbon black and silica at an elevated temperature. For example, see U.S. Pat. Nos. 5,679,728 and 6,028,137.

In practice, as hereinbefore discussed, the said 1-thioglycerol(3-mercapto-1,2-propanediol) and/or 2,2'-benzothiazyl disulfide may be provided as being supported on a carrier, such as carbon black, in order to promote an improved dispersion of the materials in the rubber composition. They may be provided as being supported on a carbon black carrier by a process such as, for example, by dissolving the materials in a volatile organic solvent such as, for example acetone, and adding the solvent solution to the particulate carbon black, then removing the solvent.

It is envisioned herein that the 1-thioglycerol(3-mercapto-1,2-propanediol) and 2,2'-benzothiazyl disulfide interact in situ within the elastomer host to form a silica coupler by a mercapto-to-disulfide interaction. Thereby a coupling agent is formed with a moiety (diol) reactive with hydroxyl groups on the surface of the silica, or silica-containing carbon black and another moiety (mercapto/disulfide) which is interactive with at least one of said diene-based elastomers.

Alternately, the coupling agent may be pre-formed prior to addition to said elastomer(s) by pretreatment of synthetic silica aggregates with both of the 1-thioglycerol(3-mercapto-1,2-propanediol) and 2,2'-benzothiazyl disulfide.

Accordingly, hereinbefore discussed, the 1-thioglycerol (3-mercapto-1,2-propanediol) and 2,2'-benzothiazyl disulfide and silica material, particularly precipitated silica and/or or silica-containing carbon black, may be individually mixed with a diene-based elastomer in an internal rubber mixer to a temperature in a range of from about 125° C. to about 190° C. wherein the said 1-thioglycerol(3-mercapto-1,2-propanediol) diol moiety is allowed to react with hydroxyl groups contained on the surface of said silica material in situ within the elastomer host.

It is preferred that such in situ reaction within the elastomer host is accomplished without an appreciable, and preferably in the absence of, evolution of an alcohol. Indeed, by the inherent chemistry of a conventional reaction of said diol moiety of 1-thioglycerol(3-mercapto-1,2-propanediol) with hydroxyl groups contained on the surface of said silica material, water a byproduct of the reaction is evolved instead of an alcohol.

In the further practice of the invention, the aforesaid in situ reaction of said 1-thioglycerol(3-mercapto-1,2-propanediol) and a silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the diol moiety of 1-thioglycerol(3-mercapto-1,2-propanediol) and pre-hydrophobated silica material as to a resulting product thereof In particular, is it considered herein that pre-hydrophobation of the silica material, particularly with an alkyl silane or alkoxy silane, enables a more efficient mixing, or processing, of it within the elastomer host in that such pre-hydrophobation of the silica material (1) renders it more compatible with the diene-based elastomer and (2) substantially reduces a tendency for a precipitated silica to re-agglomerate with itself within the elastomer host. Moreover, the accompanying in situ reaction of the diol moiety of 1-thioglycerol(3-mercapto-1,2-propanediol) now enables both the more efficient mixing coupled with the associated reaction with only a minimal evolution of an alcohol, preferably no evolution of alcohol from the rubber composition.

In an additional practice of the invention, a reaction of said 1-thioglycerol(3-mercapto-1,2-propanediol) with said silica material is accomplished without an appreciable in situ reaction thereof within the elastomer host. In such method, said 1-thioglycerol(3-mercapto-1,2-propanediol) is (1) reacted with said silica material or is (2) reacted in combination with a hydrophobating agent (a pre-treatment of the silica) prior to addition to the diene-based elastomer in an internal rubber mixer. Use of such pre-treated silica is considered herein to be important as to both the process of mixing and the 1-thioglycerol(3-mercapto-1,2-propanediol) and hydrophobating agent treated silica material as to a resulting product thereof. In particular, is it considered herein that pre-hydrophobation of the silica material, particularly with an alkyl silane or alkoxy silane, enables a more efficient mixing, or processing, of it within the elastomer host in that such pre-hydrophobation of the silica material (1) renders it more compatible with the diene-based elastomer and (2) substantially reduces a tendency for a precipitated silica to re-agglomerate with itself within the elastomer host. Moreover, use of the silica material having been pre-treated with both the 1-thioglycerol(3-mercapto-1,2-propanediol) and hydrophobating agent enables both the more efficient mixing of the silica material with the associated diene-based elastomer(s) coupled with the associated reaction of the 1-thioglycerol(3-mercapto-1,2-propanediol) within the elastomer host with only a minimal evolution of an alcohol, preferably no evolution of alcohol from the rubber composition.

In an additional practice of the invention the silica material, namely said precipitated silica and/or silica treated carbon black, is pre-treated prior to addition to said diene-based elastomer host with both of said 1-thioglycerol(3-mercapto-1,2-propanediol) and alkylsilane of the general formula (I) is provided, or introduced by mixing with the elastomer, as a pre-formed composite (prior to addition to said elastomer) of said precipitated silica and said 1-thioglycerol(3-mercapto-1,2-propanediol). Therefore a minimal, if any, in situ reaction of the 1-thioglycerol(3-mercapto-1,2-propanediol) and silica occurs within the elastomer host. For such purpose, such composite may be formed, for example, by reaction of the 1-thioglycerol(3-mercapto-1,2-propanediol) with the aggregates of the precipitated silica or by reaction of the 1-thioglycerol(3-mercapto-1,2-propanediol) with the formative colloidal silica particles prior or during their aggregation in the precipitation process.

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the further practice of this invention, particulate reinforcement for the rubber composition may be particulate synthetic amorphous silica, or a combination of carbon black and amorphous silica (exclusive of silica treated carbon black), usually of an amount in a range of about 35 to about 100 alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 $cm^3$/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165 GR, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily, directed to the utilization a non-silane containing coupling agent for enhancing reinforcement of a conjugated diene-based elastomer with a particulate synthetic amorphous silica material which contains hydroxyl groups (e.g. silanol groups) on its surface.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

A one liter, open-top, glass reactor was charged with 54.8 g of N330 carbon black suspended by stirring in 100 ml of acetone solvent. To the suspension is then added 21.6 g of 1-thioglycerol (3-mercapto-1,2-propanediol) and 33.2 g of 2,2'-benzothiazyl disulfide, with continued stirring at about 24° C. for about 60 minutes. The acetone solvent was removed under reduced pressure with stirring to yield 109 g of particles composed of about 50 percent by weight of the carbon black and about 50 percent of the combination of 1-thioglycerol (3-mercapto-1,2-propanediol) and 2,2'-benzothiazyl disulfide in a weight ratio (of the thioglycerol to disulfide) of about 2/3.

EXAMPLE II

Rubber compositions comprised of natural rubber and solution SBR with carbon black and silica as reinforcements were prepared as shown in Table 1. The first non-productive mixing step was conducted for about 4 minutes to a temperature of about 160° C. the final productive mixing step was conducted for about 2 minutes to a final temperature of about 110° C.

The Control Sample A had no coupler added during the second non-productive mixing step. Control Sample B had the silane coupler added during the second non-productive mixing step and the experimental Sample C had the non-silane coupling agent combination added during the second non-productive mixing step.

The elements of Control Samples A and B and Sample C are shown in the following Table 1.

TABLE 1

| Material | Control Sample A | Control Sample B | Sample C |
|---|---|---|---|
| Non-productive Mixing Step, 1 | | | |
| Natural rubber[1] | 50 | 50 | 50 |
| Styrene/butadiene rubber[2] | 50 | 50 | 50 |
| Carbon black[3] | 43 | 43 | 43 |
| Processing oil[4] | 5.8 | 5.8 | 5.8 |
| Antioxidant/antiozonant[5] | 3.3 | 3.3 | 3.3 |
| Stearic acid | 2 | 2 | 2 |
| Zinc oxide | 2.5 | 2.5 | 2.5 |

TABLE 1-continued

| Material | Control Sample A | Control Sample B | Sample C |
|---|---|---|---|
| Non-productive Mixing Step 2 | | | |
| Silica[6] | 17 | 17 | 17 |
| Processing oil[4] | 3 | 3 | 3 |
| Non-silane coupler (50% active)[7] | 0 | 0 | 4 |
| Silane coupler (50% active)[9] | 0 | 3.5 | 0 |
| Productive Mixing Step | | | |
| Sulfur | 1.3 | 1.3 | 1.3 |
| Accelerator(s)[8] | 1.1 | 1.1 | 1.1 |

[1]Natural rubber
[2]Styrene/butadiene rubber obtained as SLF1216 from The Goodyear Tire & Rubber Company
[3]ASTM N299
[4]Naphthenic/parrafinic rubber processing oil
[5]P-phenylenediamine type
[6]Obtained as Hi-Sil ® 210 from PPG Industries
[7]Product of Example 1, said 1-thioglycerol and said disulfide dispersed on carbon black on a 50/50 weight basis
[8]Sulfenamide type
[9]Si-69 on carbon black from Degussa Various physical properties of the Samples of Table 1 were evaluated and reported in the following Table 2.

TABLE 2

| | Parts | | |
|---|---|---|---|
| Properties | Sample A Control | Sample B Control | Sample C |
| Modulus/Tensile/Elongation | | | |
| 100%, MPa | 1.7 | 2.1 | 2.2 |
| 300%, MPa | 9 | 12.3 | 11.6 |
| 300/100 modulus ratio | 5.4 | 5.8 | 5.4 |
| Ult tensile strength (MPa) | 17.1 | 19 | 18.8 |
| Ult elongation (%) | 475 | 439 | 457 |
| Hardness (Shore A) | | | |
| 23° C. | 61 | 64 | 66 |
| 100° C. | 52 | 56 | 58 |
| Rebound % | | | |
| 23° C. | 48 | 49 | 47 |
| 100° C. | 61 | 64 | 61 |
| Tear Resistance, N | 80 | 76 | 73 |
| DIN Abrasion (cc loss) | 120 | 105 | 102 |
| Dynamic Stiffness | | | |
| 0° C. | | | |
| E' | 18.3 | 20.3 | 23.1 |
| Tan delta | 0.170 | 0.175 | 0.159 |
| 60° C. | | | |
| E' | 6.9 | 8.8 | 10 |
| Tan delta | 0.092 | 0.091 | 0.096 |

The results, shown in Table 2, clearly show the importance of adding a coupling agent to Control Sample A, whether it is a silane or non-silane type coupling agent. The non-silane coupling agents, which are the subject of this invention, show improvement in several of the measured properties when compared to Control Sample A which contains no coupler. Higher values for 300 percent modulus, ultimate tensile strength, hardness and dynamic stiffness are shown for Sample C as compared to the Control Sample A. Sample C also show a dramatic improvement in DIN abrasion which suggests improved treadwear for tire tread applications. The results for Sample C are similar to those for Control Sample B which contains the silane coupling agent.

While various embodiments are disclosed herein for practicing the invention, it will be apparent to those skilled in this art that various changes and modifications may be made therein without departing from the spirit or scope of the invention.

What is claimed is:

1. A rubber composition which comprises (A) 100 parts by weight of an elastomer host as at least one diene-based elastomer, (B) about 25 to about 100 phr of particulate reinforcement as reinforcing filler comprised of about zero to about 100 phr of synthetic amorphous precipitated silica aggregates and, correspondingly, from zero to about 75 phr of at least one of carbon black and silica treated carbon black having domains of silica on its surface, wherein said silica aggregates and said silica domains on the surface of said treated carbon black contain hydroxyl groups on their surface; and (C) about 0.5 to about 10 phr of a coupling agent as a combination of materials consisting of 1-thioglycerol (3-mercapto-1,2-propanediol) and 2,2'-benzothiazyl disulfide in a weight ratio of said thioglycerol material to said disulfide material in a range of from about 1/10 to 10/;

wherein said 1-thioglycerol(3-mercapto-1,2-propanodiol) is provided with said elastomer(s), according to one or more of the following (1) said 1-thioglycerol(3-mercapto-1,2-propanodiol) is reacted with the surface of said silica aggregates and/or silica treated carbon black in situ within the elastomer host.

(2) said 1-thioglycerol(3-mercapto-1,2-propanodiol), together with a hydrophobating agent are reacted with the surface of said silica aggregates and/or silica treated carbon black in situ within the elastomer host, wherein said hydrophobating agent is of the general Formula (1):

$$Xn—Si—R4\text{-}n \qquad (I)$$

wherein X is a radical selected from methoxy, ethoxy, chlorine or bromine radicals; R is an alkyl radical having from 1 to 18 carbon atoms; and n is an integer of 1 through 3, (3) said 1-thioglycerol(3-mercapto-1,2-propanodiol) is provided as a pre-formed composite, prior to addition to said elastomer, of said silica aggregates and said 1-thioglycerol(3-mercapto-1,2-propanodiol), wherein (a) said pre-formed composite is formed by (i) by reaction of the 1-thioglycerol(3-mercapto-1,2-propanodiol) with said silica aggregates, or (ii) by reaction of the 1-thioglycerol(3-mercapto-1,2-propanodiol) with the formative colloidal silica particles prior or during their aggregation in the silica precipitation process, or (b) said pre-formed composite is reacted with a hydrophobating agent of the said general formula (1) in situ within the elastomer host.

2. The rubber composition of claim 1 wherein said compositions contains about 35 to about 90 phr of particulate reinforcing filler comprised of about 10 to about 70 phr of said silica aggregates and, correspondingly, from about 10 to about 60 phr of at least one of carbon black and silica treated carbon black having domains of silica on its surface, wherein said silica aggregates and said silica domains on the surface of said treated carbon black contain hydroxyl groups on their surface.

3. The rubber composition of claim 1 wherein said reinforcing filler is a combination of said silica aggregates and carbon black.

4. The rubber composition of claim 1 wherein said reinforcing filler is a silica treated carbon black derived from (a) treating carbon black with an alkoxy silane or (b) co-fuming silica and carbon black at an elevated temperature.

5. The rubber composition of claim 1 wherein said reinforcing agent is a silica treated carbon black derived from (a) treating carbon black with an alkoxy silane or (b) co-fuming silica and carbon black at an elevated temperature.

6. The rubber composition of claim 1 wherein said reinforcing filler is comprised of said silica aggregates and carbon black exclusive of silica-treated carbon black and which is comprised of at least about 5 phr of carbon black and at least 10 phr of said silica aggregates.

7. The rubber composition of claim 1 wherein said 1-thioglycerol(3-mercapto-1,2-propanodiol) is reacted with the surface of said silica aggregates and/or silica treated carbon black in situ within the elastomer host.

8. The rubber composition of claim 1 wherein said 1-thioglycerol(3-mercapto-1,2-propanodiol), together with a hydrophobating agent of the said general formula (I) are reacted with the surface of said silica aggregates and/or silica treated carbon black in situ within the elastomer host.

9. The rubber composition of claim 1 wherein said 1-thioglycerol(3-mercapto-1,2-propanodiol) is provided as a pre-formed composite, prior to addition to said elastomer, of said silica aggregates and said 1-thioglycerol(3-mercapto-1, 2-propanodiol).

10. The rubber composition of claim 9 wherein said pre-formed composite is formed by reaction of the 1-thioglycerol(3-mercapto-1,2-propanodiol) with the said silica aggregates.

11. The rubber composition of claim 10 wherein said pre-formed composite is reacted with a hydrophobating agent of the said general formula (I) in situ within the elastomer host.

12. The rubber composition of claim 1 wherein said pre-formed composite is formed (1) by reaction of said 1-thioglycerol(3-mercapto-1,2-propanodiol) and/or hydrophobating agent with said silica aggregates or (2) by reaction of the 1-thioglycerol(3-mercapto-1,2-propanodiol) and/or hydrophobating agent of the said general formula (I) with the formative colloidal silica particles during their aggregation in the precipitation process.

13. The rubber composition of claim 1 wherein said diene-based elastomer(s) is selected from homopolymers and copolymers of monomers selected from at least one of the group consisting of isoprene and 1,3-butadiene and copolymers of styrene and at least one diene selected from at least one of the group consisting of isoprene and 1,3-butadiene.

14. The rubber composition of claim 1 wherein said diene-based elastomer(s) is selected from the group consisting of at least one of natural and synthetic cis 1,4-polyisoprene, cis 1,4-polybutadiene, aqueous emulsion polymerization prepared and organic solvent solution polymerization prepared styrene/butadiene copolymers, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers and their mixtures.

15. An article of manufacture which contains at least one component comprised of the rubber composition of claim 1.

16. A tire which contains at least one component comprised of the rubber composition of claim 1.

17. A tire having a tread comprised of the rubber composition of claim 1.

18. A tire having a tread comprised of the rubber composition of claim 2.

19. A tire having a tread comprised of the rubber composition of claim 1, wherein (A) said 1-thioglycerol(3-mercapto-1,2-propanodiol) is provided as a pre-formed composite, prior to addition to said elastomer, of said silica aggregates and said 1-thioglycerol(3-mercapto-1,2-propanodiol), and wherein (B) said hydrophobating agent of Formula (I) is an alkylsilane selected from at least one of the group consisting of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, diethoxy dimethyl silane.

20. A tire having a tread comprised of the rubber composition of claim 1, wherein:

(A) said 1-thioglycerol(3-mercapto-1,2-propanodiol), together with a hydrophobating agent of the said general formula (I) are reacted with the surface of said silica aggregates in situ within the elastomer host, and wherein (B) said hydrophobating agent of Formula (I) is an alkylsilane selected from at least one of the group consisting of trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, diethoxy dimethyl silane.

* * * * *